(12) United States Patent
van der Huizen et al.

(10) Patent No.: US 9,951,160 B2
(45) Date of Patent: Apr. 24, 2018

(54) POLYALKENYL COUPLING AGENT AND CONJUGATED DIENE POLYMERS PREPARED THEREFROM

(71) Applicants: Adriaan Albert van der Huizen, Castricum (NL); Frank Wijnand de Wit, Houten (NL)

(72) Inventors: Adriaan Albert van der Huizen, Castricum (NL); Frank Wijnand de Wit, Houten (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/712,505

(22) Filed: May 14, 2015

(65) Prior Publication Data
US 2016/0333122 A1   Nov. 17, 2016
US 2017/0114161 A9   Apr. 27, 2017

(30) Foreign Application Priority Data

May 16, 2014  (NL) ................................ 2012829

(51) Int. Cl.
| | | |
|---|---|---|
| C08F 36/06 | (2006.01) | |
| C08F 36/08 | (2006.01) | |
| C08C 19/02 | (2006.01) | |
| C08F 297/04 | (2006.01) | |

(52) U.S. Cl.
CPC ............. *C08F 36/06* (2013.01); *C08C 19/02* (2013.01); *C08F 36/08* (2013.01); *C08F 297/044* (2013.01)

(58) Field of Classification Search
CPC ...... C08C 19/02; C08F 297/044; C08F 36/06; C08F 36/08
See application file for complete search history.

(56) References Cited

U.S. PATENT DOCUMENTS

| | | | |
|---|---|---|---|
| 3,595,942 A | 7/1971 | Wald et al. | |
| 4,894,397 A | 1/1990 | Lee et al. | |
| 5,070,131 A * | 12/1991 | Rhodes | C10M 143/12 524/481 |
| 5,296,547 A | 3/1994 | Nestegard | |
| 5,360,875 A | 11/1994 | Wollum et al. | |
| 5,395,787 A | 3/1995 | Lee et al. | |
| 5,552,493 A | 9/1996 | Bridget et al. | |
| 5,563,204 A * | 10/1996 | Speth | B29C 41/003 523/335 |
| 6,417,270 B1 | 7/2002 | Masse et al. | |

FOREIGN PATENT DOCUMENTS

| | | |
|---|---|---|
| GB | 1030306 A | 5/1966 |
| JP | H04283296 A | 10/1992 |
| JP | H1028879 A | 2/1998 |
| JP | 2005041966 A | 2/2005 |
| WO | 2008074513 A1 | 6/2008 |

OTHER PUBLICATIONS

Li et al. Journal of Polymer Science Part A: Polymer Chemistry vol. 32 pp. 2023-2027 (Aug. 1994).*
Endo, T., Ohshima, A., Akira, N., Nomura, R., Mizutani, Y., "Synthesis of networked polystyrene endowed with nucleophilic reaction sites by the living anionic polymerization techniques", J. Poly. Sci., Part A, Polymer Chemistry, (2000) pp. 2543-2547, 38(14).
International Search Report for PCT/US2015/030841, dated Jul. 28, 2015.
Taiwan Search Report for TW 104115645, dated May 16, 2016.
Endo, et al., "J.Polymer Sci. Part A", Synthesis of networked polystyrene endowed with nucleophilic reaction sites by the living anionic polymerization technique, Jun. 7, 2000, 2543-2547.

* cited by examiner

*Primary Examiner* — Irina S Zemel
*Assistant Examiner* — Jeffrey S Lenihan
(74) *Attorney, Agent, or Firm* — Samantha Page; Cantor Colburn LLP

(57) ABSTRACT

A process is provided for preparing a coupled polymer by anionic polymerization wherein the coupled polymer is a conjugated diene polymer comprising the following reaction steps:
  a) polymerizing a monomer or a mixture of monomers comprising at least one conjugated diene optionally one or more monoalkenyl arene compounds in the presence of an anionic initiator to form a living polymer arm or mixture of arms with an average apparent molecular weight greater than 2000;
  b) reacting the living polymer arm or arms with a polyalkenyl coupling agent;
  c) terminating the polymerization if any living polymers remain after step b); and
  d) optionally functionalizing and/or hydrogenating the coupled polymer so produced,
wherein the polyalkenyl coupling agent is an alpha,omega-bis(vinylphenyl)alkane. Also provided is the polymer so prepared and its use in concentrates, aqueous emulsions and products made from aqueous emulsions.

17 Claims, No Drawings

POLYALKENYL COUPLING AGENT AND CONJUGATED DIENE POLYMERS PREPARED THEREFROM

TECHNICAL FIELD

The current invention concerns a polyalkenyl coupling agent and conjugated diene polymers prepared therefrom. More specifically, it concerns new conjugated diene polymers prepared in the presence of an anionic initiator by coupling with a specific polyalkenyl coupling agent. In addition, it concerns the process for preparing the new conjugated diene polymers, which includes the preparation of a living polymer by anionic polymerization and coupling the living polymer with the specific coupling agent. The expression conjugated diene polymer includes copolymers.

BACKGROUND ART

Coupling agents are commonly used in polymers prepared by anionic polymerization. Examples of suitable multifunctional coupling agents include silicon halides, polyepoxides, polyisocyanates, polyketones, polyanhydrides, dicarboxylic acid esters. Suitable polyalkenyl coupling agents may be aliphatic, aromatic or heterocyclic. Examples of aliphatic polyalkenyl coupling agents include the polyvinyl and polyalkyl acetylenes, diacetylenes, phosphates and phosphites, dimethacrylates such as ethylene dimethacrylate, and the like. Examples of suitable heterocyclic polyalkenyl coupling agents include divinyl pyridine, divinyl thiophene, and the like. Examples of suitable aromatic alkenyl coupling agents include polyvinyl benzene, polyvinyl toluene, polyvinyl xylene, polyvinyl anthracene, polyvinyl naphthalene, divinyl durene and the like. Suitable polyvinyl groups include divinyl, trivinyl and tetravinyl. Divinylbenzene (DVB) is the preferred coupling agent in U.S. Pat. No. 5,393,787, and may include o-divinylbenzene, m-divinylbenzene, p-divinylbenzene, and mixtures of the same.

Divinylbenzene is therefore a known polyalkenyl coupling agent. The coupling agent is used for the preparation of conjugated diene polymers, i.e., styrenic block copolymers as well as polymers of conjugated dienes. Divinylbenzene is highly reactive. Unfortunately, control of the reaction is difficult. This may lead to undesirable side reactions, gelation, occurrence of weak parts in the polymer structure that degrades in a subsequent reaction (e.g., hydrogenation) or upon use (oxidative stability). Moreover, DVB is only available as relatively impure monomer. It is commercial available as technical grade 80% or 55%. Some suppliers have 85% divinylbenzene for sale. The content of impurities in DVB is therefore high. As a consequence, polymers coupled with DVB as polyalkenyl coupling agent will contain impurities, which adversely affects the properties of the polymers so produced or its application, e.g., in food-contact and medical applications.

For this reason, there is a demand for a substitute for DVB in the production of conjugated diene polymers. A suitable coupling agent, however, not only needs to be pure, but it also needs to be sufficiently reactive to couple at least two living polymer arms (same or different) to form a coupled polymer. Additional arms may be a benefit, e.g., where the coupling agent forms a core onto which a large number of living polymer arms are attached. Moreover, the coupling agent should also be sufficiently robust to withstand a subsequent hydrogenation step without degradation. Now a suitable coupling agent has been found that is sufficiently pure, sufficiently active, and sufficiently robust.

SUMMARY OF THE INVENTION

A polyalkenyl coupling agent has now been found that can be used in the preparation of a conjugated diene polymer, made by anionic polymerization.

Accordingly, a process is provided for preparing a coupled polymer by anionic polymerization wherein the coupled polymer is a conjugated diene polymer, preferably a styrenic block copolymer or a polymer of a conjugated diene, comprising the following reaction steps:
  a) polymerizing a monomer or a mixture of monomers comprising at least one conjugated diene and optionally one or more monoalkenyl arene compounds in the presence of an anionic initiator to form a living polymer arm or mixture of arms;
  b) reacting the living polymer arm or arms with a polyalkenyl coupling agent;
  c) terminating the polymerization if any living polymers remain after step b); and
  d) optionally functionalizing and/or hydrogenating the coupled polymer so produced,
wherein the polyalkenyl coupling agent is an alpha,omega-bis(vinylphenyl)alkane, preferably 1,2-bis(vinylphenyl)ethane.

DETAILED DESCRIPTION OF THE INVENTION

As is well-known, living polymers may be prepared by anionic solution polymerization of conjugated dienes and monoalkenyl arene compounds in the presence of an alkali metal or an alkali-metal hydrocarbon, e.g. sodium naphthalene, as anionic initiator. The preferred initiator is lithium or a monolithium hydrocarbon. Many lithium hydrocarbons are suitable, wherein the hydrocarbon contains from 1 to 40 carbon atoms and in which lithium has replaced one or more hydrogen atoms. It should be understood that in addition to monovalent lithium compounds such as alkyl lithium compounds, also dilithium and polylithium compounds may be used, as well as mixtures of hydrocarbon lithium compounds. Particularly advantageous are for instance alkyl lithium compounds such as methyl lithium, ethyl lithium, n-butyl lithium, s-butyl lithium ("s-BuLi"), hexyl lithium, 2-ethylhexyl lithium, n-hexadecyl lithium and the like. Particularly preferred is s-BuLi as sole initiator.

The concentration of the initiator used to prepare the living polymer may vary between wide limits and is determined by the desired molecular weight of the living polymer. For block copolymers, the hydrocarbon lithium based initiator is usually employed in amounts of 10 to 2000 ppm Li, preferably 100 to 1000 ppm Li based on the weight of the monomer or monomer mixture. For conjugated diene polymers, the hydrocarbon lithium based initiator is usually employed in similar concentrations of 10 to 2000 ppm Li, preferably 100 to 1000 ppm Li based on the weight of the diene monomer. The initiators may be added to the polymerization mixture in two or more stages optionally together with additional monomer. The living polymers are olefinically and, optionally, aromatically unsaturated.

The conditions for producing polymers by anionic polymerization in the presence of a lithium-based initiator are well-known in the art. Typically, solvent, initiator and monomer(s) are first made free of chemical impurities, moisture and air, all of which adversely impact the polymerization.

The monomer(s) should be at least 90 mole percent pure. The purified streams enter a reactor or chain of reactors into which the initiator is injected, and the polymerization begins.

The living polymers obtained by reaction step (a), which are linear unsaturated living polymers, are prepared from one or more conjugated dienes, e.g. $C_4$ to $C_{12}$ conjugated dienes and, optionally, one or more monoalkenyl arene compounds.

Specific examples of suitable conjugated dienes include 1,3-butadiene; isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene and in particular butadiene, isoprene and mixtures thereof being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alpha-methylstyrene and tertiary-butylstyrene. Styrene is the preferred monoalkenyl arene compound. The living polymers may also be partly derived from small amounts of other monomers such as monovinylpyridines, alkyl esters of acrylic and methacrylic acids (e.g. methyl methacrylate, dodecyclmethacrylate, octadecyclmethacrylate), vinyl chloride, vinylidene chloride, monovinyl esters of carboxylic acids (e.g. vinyl acetate and vinyl stearate). Preferably, the living polymers are derived entirely from hydrocarbon monomers. If a monoalkenyl arene compound is used in the preparation of the living polymers it is preferred that the amount thereof be below about 70% by weight. More in particular, if the monoalkenyl arene compound is polymerized in blocks, the block or blocks of poly(monoalkenyl arene) in the final coupled polymer preferably comprise no more than 50% by weight, preferably no more than 35% by weight on the weight of the coupled polymer.

The living polymers may be living homopolymers based on a conjugated diene, living copolymers, living terpolymers, living tetrapolymers, etc. The living homopolymers based on a conjugated diene may be represented by the formula B-M, wherein M is a carbanionic group, e.g. lithium, and B is polybutadiene or polyisoprene. The living copolymers may be represented by the formula B'-M, wherein B' is a block random or tapered copolymer such as poly(butadiene/isoprene), poly(butadiene/styrene) or poly(isoprene/styrene). The living copolymer may also be represented by the formula A-B-M, wherein A is a polystyrene block. Combinations and living copolymers with a greater number of blocks are within the scope of this invention.

As stated above, the living copolymers may be living block copolymers, living random copolymers or living tapered copolymers.

Living block copolymers are made by polymerizing a first monomer to full completion, and then adding an alternative monomer. Thus, the living block copolymers may be prepared by the step-wise polymerization of the monomers e.g. by polymerizing isoprene to form living polyisoprene followed by the addition of another monomer. e.g. styrene, to form a living block copolymer having the formula polyisoprene-polystyrene-M, or styrene may be polymerized first to form living polystyrene followed by addition of isoprene to form a living block copolymer having the formula polystyrene-polyisoprene-M. The living copolymers may also have a controlled distribution of monomers in the midblock B, for instance having the formula polystyrene-poly(butadiene/styrene)-M, wherein the relative content of styrene in the poly(butadiene/styrene) copolymer block is low where it is closest to the polystyrene block.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine. N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

For an optimum coupling result with the polyalkenyl coupling agent, the living polymer is preferably capped with one or more styrene monomer molecules, e.g., closest to the carbanionic group M. As a result, the styrene monomer is part of the living polymer, located at the end where it will be attached to the coupling agent or core made of two or more coupling agent molecules.

The solvents in which the living polymers are formed are inert liquid solvents such as hydrocarbons e.g. aliphatic hydrocarbons, such as pentane, hexane, heptane, oxtane, 2-ethylhexane, petroleum ether, nonane, decane, cyclopentane, cyclohexane, methylcyclohexane or aromatic hydrocarbons e.g. benzene, toluene, ethylbenzene, the xylenes, diethylbenzenes, propylbenzenes. In general cyclohexane is a preferred solvent. Mixtures of hydrocarbons e.g. lubricating oils may also be used.

The temperature at which the polymerization is carried out may vary between wide limits such as from −50° C. to 150° C. Typically, temperatures of 0 to 100° C. for small-scale and up to 150° C. for large-scale operations may be used for reaction times of 3 to 60 hours. Preferably the polymerization is carried out from about 20° to about 80° C.

The reaction is suitably carried out in an inert atmosphere such as nitrogen and may be carried out under pressure e.g. a pressure of from about 0.5 to about 10 bars.

In particular for the preparation of polyisoprene according to the current invention, the initiation and polymerization is carried out under pressure at a temperature preferably in the range of from 40 to 60° C. The polymerization is generally carried out for a time sufficient to achieve at least 99% conversion of the monomer feed. This may be achieved within about 1 hour or even less.

The molecular weight of the living polymers prepared in reaction step (a) may vary between wide limits, with 2,500 as lower limit. Suitable number average molecular weights are from about 5,000 to about 150,000 with number average molecular weights of from about 15,000 to about 100,000 being preferred. Living polymers with even higher number average molecular weights may also be used, but will require more dedicated conditions due to the higher viscosity of the solution of such polymers.

The living polymers produced in reaction step (a) are then reacted, in reaction step (b), with the polyalkenyl coupling agent.

The polyalkenyl coupling agent should be added to the living polymer after the polymerization of the monomers is substantially complete, i.e. the agent should only be added after substantially all of the monomer has been converted to living polymers.

The amount of polyalkenyl coupling agent added may vary between wide limits but preferably at least 0.2 mole is used per mole of unsaturated living polymer. Amounts of from 0.4 to 5 moles, preferably from 0.5 to 4.5 moles are preferred. The amount, which may be added in a single shot or more stages, is usually such so as to convert at least 80 or 85% wt. of the living polymers into coupled polymers. If more than the stoichiometric amount of coupling agent is used, then the coupling agent molecules may polymerize to form a core or nucleus of polymerized or even cross-linked coupling agent molecules. It then acts as a multifunctional coupling agent, resulting in a soluble star-shaped polymer. The number of arms may vary considerably but is typically between 4 and 25, more likely from about 10 to about 20. Examples of star-shaped homopolymers may be represented by the formula $B-x-B_n$ and of star-shaped copolymers may be represented by the formula $AB-x-BA_n$, wherein n is an integer, usually between 3 and 24 and x is the nucleus formed from the alpha,omega-bis(vinylphenyl)alkane used as polyalkenyl coupling agent. From the above it can be seen that x is preferably a nucleus formed from 1,2-bis(vinylphenyl)ethane, hereinafter called BVPE. Also more complex star-shaped polymers can be made.

The reaction step (b) may be carried out in the same solvent as for reaction step (a). A list of suitable solvents is given above. The reaction step (b) temperature may also vary between wide limits e.g. from 0° to 150° C., preferably from 200 to 120° C. The reaction may also take place in an inert atmosphere e.g. nitrogen and under pressure e.g. a pressure of from 0.5 to 10 bars.

The coupling agent does not necessarily terminate the reaction. The polymers produced in step b) may still be "living". If such is the case, then they may be deactivated or "killed", in known manner, by the addition of a compound which reacts with the carbanionic end group. As examples of suitable deactivators may be mentioned, compounds with one or more active hydrogen atoms such as water, alcohols (e.g. methanol, ethanol, isopropanol, 2-ethylhexanol) or carboxylic acids (e.g. acetic acid), compounds with one active halogen atom, e.g. a chlorine atom (e.g. benzyl chloride, chloromethane), compounds with one ester group and carbon dioxide. If not deactivated in this way, the living polymers may be killed by the optional step (d).

However, before being killed, the living polymers may be reacted with further amounts of monomers such as the same or different dienes and/or monoalkenyl arene compounds of the types discussed above. This is of particular of interest to star-shaped polymers. The effect of this additional step, apart from increasing the number of polymer chains, is to produce a living star-shaped polymer having at least two different types of polymer chains. This is therefore an alternative to using a mixture of living polymers (P) prior to the coupling step. For example, a living star-shaped polymer derived from living polyisoprene may be reacted with further isoprene monomer to produce a further living star-shaped polymer having polyisoprene chains of different number average molecular weights. Alternatively, the living star-shaped polyisoprene homopolymer may be reacted with styrene monomer to produce a further living star-shaped copolymer having both polyisoprene and polystyrene homopolymer chains. Thus it can be seen that by different polymer chains is meant chains of different molecular weights and/or chains of different structures. These further polymerizations may take place under substantially the same conditions as described for reaction step (a) of the process. The additional chains may be homopolymer, copolymer chains etc., as described above.

As used in this specification and claims, the term molecular weight refers to polystyrene equivalent, or apparent, molecular weight of the polymer or block of the copolymer, measured with gel permeation chromatography (GPC) using polystyrene calibration standards, such as is done according to ASTM D5296-11. GPC is a well-known method wherein polymers are separated according to molecular size, the largest molecule eluting first. The chromatograph is calibrated using commercially available polystyrene molar mass standards. The detector used is preferably a combination ultraviolet and refractive index detector. The molecular weight expressed herein is expressed as number average molecular weight (Mn) or weight average molecular weight (Mw). The molecular weight distribution (D) is expressed as the ratio of Mw over Mn. The ratio of the Mn for a coupled polymer over the Mn of the uncoupled precursor polymer is indicated as apparent degree of branching (DoB). This apparent degree of branching is in general lower than the "real" number of polymer arms, as the GPC method separates on the basis of molecular size as indicated above.

Pursuant to step (d), the polymers according to the current invention may be hydrogenated. These polymers advantageously are very stable during hydrogenation.

The polymers of the present invention may be hydrogenated by any suitable technique. Suitably at least 50%, preferably at least 70%, more preferably at least 90%, most preferably at least 95% of the original olefinic unsaturation is hydrogenated. If the star-shaped polymer is partly derived from a monoalkenyl arene compound, then the amount of aromatic unsaturation which is hydrogenated, if any, will depend on the hydrogenation conditions used. However, preferably less than 10%, more preferably less than 5% of such aromatic unsaturation is hydrogenated.

The hydrogenation can be carried out in any desired way. A hydrogenation catalyst may be used e.g. a copper or molybdenum compound. Compounds containing noble metals or noble-metal compounds can be used as hydrogenation catalysts. Preference is given to catalysts containing a non-noble metal or a compound thereof of Group VIII of the Periodic Table i.e. iron, cobalt and in particular, nickel. As examples may be mentioned. Raney nickel and nickel on kieselguhr. Special preference is given to hydrogenation catalysts which are obtained by causing metal hydrocarbyl compounds to react with organic compounds of any one of the group VIII metals iron, cobalt or nickel, the latter compounds containing at least one organic compound which is attached to the metal atom by means of an oxygen atom, for instance as described in U.K. Pat. Spec. No. 1,030,306. Preference is given to hydrogenation catalysts obtained by causing an aluminum trialkyl (e.g. aluminum triethyl (Al (Et)$_3$) or aluminum triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g. nickel acetonylacetonate, the nickel salt of butylacetophenone).

The hydrogenation of the polymer according to the present invention is very suitably conducted in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

A much preferred hydrogenation process is the selective hydrogenation process shown in Wald et al., U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

Albeit not described here in detail, the polymers according to the present invention may also be functionalized by any suitable technique. This includes addition of e.g., maleic acid to the polymer backbone and grafting of other polymers.

The polymer according to the present invention may be recovered in solid form from the solvent in which it is made by any convenient technique such as by evaporation of the solvent. Alternatively, an oil, e.g. a lubricating oil, may be added to the solution and the solvent stripped off from the mixture so formed to produce concentrates. It is also within the scope of the invention to prepare an aqueous latex of the polymer, by adding water and soap to the solution, emulsifying the same and again stripping of the solvent.

The invention is described with respect to 1,2-bis(vinylphenyl)ethane, or BVPE. However, it is noted that the principle applies to alpha,omega-bis(vinylphenyl)alkanes, wherein the alkane group has at least one carbon atom, preferably 2 carbon atoms and more preferably no more than 20 carbon atoms. The alkane group may be linear or branched. Moreover one or more of the carbon atoms may be substituted by nitrogen, silicon or oxygen atoms. The alkane group may be substituted, for instance with a further vinylphenylalkyl group. Most preferably, the alkane group is composed of two carbon atoms.

The vinyl group(s) on the alpha,omega-bis(vinylphenyl) alkane may be in ortho, para or meta position. Preferably they are in para or meta position. The vinyl groups may each be in the same or in a different position.

It is of particular interest that the polyalkenyl coupling agent used in the present invention does not suffer from the high amount of impurities found in DVB. For instance, p,p'-BVPE or 1,2-bis(p-vinylphenyl)ethane can be synthesized in high purity by Grignard coupling of p-vinylbenzylchloride, which is a commercially available starting material.

BVPE or 1,2-bis(vinylphenyl)ethane is little explored as commoner in anionic polymerization. The living anionic copolymerisation of styrene with BVPE or p-divinylbenzene (PDVB) with sec-butyllithium in benzene was carried out by Endo, Takeshi; Ohshima, Akira; Nomura, Ryoji; Mizutani, Yukio, "Synthesis of networked polystyrene endowed with nucleophilic reaction sites by the living anionic polymerization technique", in Journal of Polymer Science, Part A: Polymer Chemistry (2000), 38(14), 2543-2547. However, there is nothing in this article or similar art on the use of BVPE as coupling agent. Moreover, as could be expected by someone skilled in the art, an addition of BVPE to a living polymer chain would lead to an insoluble cross-linked polymer (as observed in literature on anionic and radical polymerization). This is indeed observed in the case of low molecular weight living polymers (cf. examples). Surprisingly the inventors found that at higher molecular weight this cross-linking effect is absent and solely soluble coupled or star-shaped polymers were found.

As indicated, BVPE can be synthesized in high purity by Grignard coupling of vinylbenzylchloride (VBC), which is a commercially available starting material. When p-VBC is applied as starting material it results into the pure 1,2-bis (p-vinylphenyl)ethane. Alternatively, when a mixture of p- and m-VBC is applied, the result is a mixture of three isomers of BVPE, i.e. the p,p', p,m and m,m'-isomers. The p,p'-isomer is a crystalline solid with a melting point of ca. 96° C. When using a p/m-VBC mixture as starting material, the resulting mixture of BVPE isomers can be crystallized in order to get a p,p'-isomer rich fraction and a fraction that is rich in the p,m and m,m' isomers.

BVPE was investigated as two different compositions: the pure p,p'-isomer which is a crystalline solid and a mixture of isomers (consisting of mostly p,m- and m,m'-isomers) which makes a hydrocarbon soluble liquid. Both compositions have advantages. Thus, the crystalline BVPE is very stable and does not require a stabilizer for long term storage. The mixture of isomers requires such a stabilizer to prevent polymerization on standing, but does not have to be dissolved to be used in step (b) as it is a liquid. It also has a higher hydrocarbon solubility as compared to the crystalline p,p'-isomer. Also of interest is that by controlling the ratio of isomers in the mixture, its behaviour may be varied. Thus, the p,p'-isomer more quickly and/or completely reacts, whereas a greater degree of linear polymers may be made with the p,m- and m,m'-isomers. It is also possible to use the p,m- and m,m'-isomers to produce polymers with residual propenyl groups that are more susceptible to functionalization than the vinyl groups normally found when conjugated diene monomers polymerize in 1,2-fashion.

Thus, for star shaped polymers with a low content of linear coupled material, i.e., of 5% by weight or less, preferably a grade with a high average amount of isomers with para vinyl groups is used. For BVPE, this may be the pure p,p'-isomer, or a mixture with a content of the p,p'-isomer of at least 50 mole %, preferably at least 75 mole %, more preferably at least 90 mole %.

In the coupling step with polyisoprene the inventors found that an isomer mixture with about 10 mole % p,p'-isomer gave high coupling efficiencies (>90%/o) together with a relatively high percentage of linear coupled product (10-20% vs 1-3% with DVB). Using the crystalline p,p'-isomer, the coupling efficiencies attained were on the lower side (80-85% vs target>90%), but with a low linear coupled content<5%.

As indicated above, the living polymer may be capped with one or more molecules of styrene monomer. The inventors found when capping a polyisoprenyl chain end with styrene, for both BVPE grades the coupling efficiencies were high (>90%), whereas with the p,p'-isomer the required low linear coupled content could be retained.

The conjugated diene polymers prepared in accordance with the current invention can be broadly applied. Given the purity of the coupling agent and therefore lack of residual contaminants, medical applications and applications for food-contact are possible. It is also possible to produce star-shaped polymers with increased oxidative stability, which may be of use, e.g. for viscosity index improvers. The conjugated diene polymers may also be in latex form, wherein they may be used for the preparation of dipped goods, such as condoms and surgical gloves. Dipped goods are made by dipping an appropriate form in the latex and drying and curing the same.

This invention will be further understood by reference to the following non-limiting examples. In the Examples, all parts are parts by weight, unless otherwise noted.

EXAMPLES

BVPE used in the following examples was purchased from Shepherd Chem. Co. USA. Two different grades were available, i.e. the pure solid p,p' isomer and a liquid mixture of p,p', p,m and m,m' isomers. Both grades are characterized by NMR and GCMS. Composition data are provided in Table 1 below:

TABLE 1

| BVPE grade | Purity (GCMS) (%) | Physical state | p,p' (%) | p,m (%) | m,m' (%) |
|---|---|---|---|---|---|
| p,p'-isomer | 98.4 | crystalline solid | 100 | | |
| isomer mixture | 99.7 | clear liquid | 10 | 64 | 26 |

$^1$H NMR data on p,p'-BVPE in CDCl3: δ (CH2) 2.92 ppm, δ (Aryl) 7.15, 7.35 ppm, δ(Vinyl) 5.22, 5.73, 6.72 ppm.

DVB (80% purity) was used as received ex-Sigma-Aldrich. Monomers (styrene, butadiene, isoprene) and solvents used were all polymerization grade.

Coupling efficiency (CE) is defined as the proportion of polymer chains which were living, P—Li, at the time BVPE was added that are linked via the residue of the coupling agent at the completion of the coupling reaction. Gel Permeation Chromatography (GPC) data is used to calculate the coupling efficiency of a polymer product. These GPC determinations were carried out using polystyrene calibration standards, in accordance to ASTM D5296-11. The sum of the areas under the GPC curve for all the coupled species is divided by the sum of the areas for all of the coupled moieties plus the area under the curve for the starting, uncoupled polymer species. This ratio is multiplied by 100 to convert the coupling efficiency into a percentage value. In the same way, the linear coupled percentage (LC) is calculated from the ratio of the area under the curve for the linear species and the area for all the coupled species. The apparent degree of branching (DoB) is the ratio between the number average molecular weight of the coupled species and the number average molecular weight of the uncoupled starting product.

An overview on GPC data of the various examples described below is given in the Table 2. In this table PI stands for polyisoprene, PB stands for polybutadiene, PS stands for polystyrene (not in accordance with the present invention), PS-PI stands for a block copolymer, poly(styrene-co-isoprene)

Example 1

Polyisoprenes (PI, Experiments 1-12)

In a 1 L stirred reactor under nitrogen atmosphere were subsequently added 750 mL of dry deoxygenated cyclohexane, 50 g of isoprene and an appropriate amount of s-BuLi in cyclohexane as a 0.3 M solution at 60° C. in order to target the required molecular weight. For practical reasons, in a few cases as indicated in Table 2 (exp. 3-4), the amount of isoprene was reduced to 5 or 10 g. After completion of the isoprene conversion into polyisoprene a 1.0 M solution of either DVB in dry cyclohexane (comparative) or BVPE in dry toluene was added at once in a quantity as to give a Li:CA molar ratio of 1:3. In experiments 8 and 12 0.5 g of styrene was added before the addition of the coupling agent. During the coupling reaction the temperature of the vessel was raised to 80° C. for 2 h. The resulting polymers were sampled by precipitation in methanol/BHT and subjected to GPC analysis.

Example 2

Polybutadienes (PB, Experiments 13,14)

The same procedure as in Example 1 was applied with addition of butadiene instead of isoprene monomer. In both experiments ca 0.5 g of styrene was added prior to addition of the coupling agent.

Example 3

Styrene-Isoprene Block Copolymer (PS-PI Experiments 15-16)

In a 1 L stirred reactor under nitrogen atmosphere were subsequently added 750 mL of dry deoxygenated cyclohexane, 5 g of styrene and an appropriate amount of s-BuLi in cyclohexane as a 0.3 M solution at 60° C. in order to target the required molecular weight. After completion of the styrene conversion 45 g of isoprene was added in order to make a polystyrene-polyisoprene diblock copolymer. After completion of the isoprene conversion another 0.5 g of styrene was added. Coupling was carried out by addition of a 1.0 M solution of either DVB in dry cyclohexane or BVPE in dry toluene at once in a quantity as to give a Li:CA molar ratio of 1:3. After this addition the temperature of the vessel was raised to 80° C. for 2 h. The resulting polymers were sampled by precipitation in methanol/BHT (antioxidant, Ionol™ CP) and subjected to GPC analysis.

TABLE 2

| Exp | Coupling agent | Precursor | Mn precursor | % Solids | Mw | Mn | Mw/Mn | CE (%) | LC (%) | DoB | Remarks |
|---|---|---|---|---|---|---|---|---|---|---|---|
| 1 | p,p'-BVPE | PI | 0.8 | 10 | — | — | — | — | — | — | Insoluble Gel |
| 2 | DVB | PI | 0.8 | 10 | 220 | 67 | 3.26 | 100 | 0 | 84 | >90% Insoluble Gel |
| 3 | p,p'-BVPE | PI | 2.4 | 2.5 | 126 | 66 | 1.91 | 100 | 0 | 28 | Tendency to gel formation |
| 4 | DVB | PI | 2.1 | 2.5 | 40 | 30 | 1.31 | 100 | 0 | 14 | Tendency to gel formation |
| 5 | p,p'-BVPE | PI | 10.5 | 10 | 96 | 91 | 1.06 | 81 | 0 | 9 | |
| 6 | DVB | PI | 10 | 10 | 72 | 69 | 1.04 | 96 | 0 | 7 | |
| 7 | p,m-BVPE | PI | 38 | 10 | 191 | 176 | 1.09 | 96 | 22 | 5 | |
| 8 | p,p'-BVPE | PI | 40 | 10 | 258 | 240 | 1.07 | 93 | 2 | 6 | Styrene capping |
| 9 | p,p'-BVPE | PI | 52 | 10 | 295 | 255 | 1.16 | 82 | 6 | 5 | |
| 10 | DVB | PI | 55 | 10 | 340 | 320 | 1.06 | 94 | 1 | 6 | |
| 11 | p,m-BVPE | PI | 54 | 10 | 246 | 208 | 1.18 | 95 | 16 | 4 | |
| 12 | p,p'-BVPE | PI | 53 | 10 | 432 | 400 | 1.08 | 95 | 1 | 8 | Styrene capping |
| 13 | DVB | PB | 51 | 10 | 218 | 183 | 1.19 | 86 | 21 | 4 | Styrene capping |
| 14 | p,p'-BVPE | PB | 50 | 10 | 215 | 181 | 1.19 | 82 | 20 | 4 | Styrene capping |
| 15 | DVB | PS-PI | 158 | 10 | 685 | 617 | 1.1 | 86 | 10 | 4 | |
| 16 | p,p'-BVPE | PS-PI | 219 | 10 | 914 | 832 | 1.1 | 93 | 10 | 4 | Styrene capping |

All polymerizations carried out at 60 deg C. in cyclohexane
In all cases CA:Li molar ratio = 3:1
In all cases coupling at 60-80 deg C. for at least 2 h.
All molecular weights in kD apparent relative to PS standards
DVB is an 80% m,p-mixture ex-Aldrich
BVPE is 100% purity

Example 4

Hydrogenation (Polymer Solutions from Experiments 8, 10 and 12)

The polymer solution was heated to 45° C. and pressurized with $H_2$ to 1 MPa while stirring at 1100 rpm and then vented to 0-0.05 MPa. This was repeated twice for removing $N_2$. As hydrogenation catalyst was used a premixed combination of nickel octoate and triethylaluminium in a 1:2 molar ratio. Then the Ni/Al hydrogenation catalyst was injected at 20 ppm Ni on polymer solution basis. Next the reactor was pressurized to 4.3 MPa $H_2$ to get the hydrogenation started. The temperature was set to 75° C. for 4 h after which another 50 ppm of nickel catalyst was added and hydrogenation continued for another 4 h to get to a residual unsaturation<0.1 meq/gr of polymer. In all instances good results were obtained.

Observations:

Example 1 provides isoprene polymerization results with different molecular weights, different BVPE compositions and comparative DVB experiments. At very low molecular weights a person skilled in the art that would use BVPE would find an insoluble gel, worse than if DVB is used. Surprisingly, BVPE performs well as coupling agent with a living polymer having an apparent number average molecular weight of at least 2,500. A minimum apparent number average molecular weight of 2500 is therefore preferred. From the polyisoprene examples and the comparative examples in Table 2 it becomes clear that in principle BVPE affords a higher degree of branching than DVB. With increasing molecular weights however, this difference is decreasing. Within these examples it also becomes clear that with p,p'-BVPE as a coupling agent a lower linear coupled content is obtained as compared to when the BVPE isomer mixture (cf. Table 1) is applied. In all cases a styrene capping provides a higher coupling efficiency with BVPE than without styrene capping. Example 2 describes analogous examples for polybutadiene, whereas Example 3 describes analogous examples for styrene-isoprene block copolymers.

Example 4 illustrates that the capability for hydrogenating coupled polymers is unaffected by the use of BVPE as compared with DVB.

The invention claimed is:

1. A process for preparing a coupled polymer by anionic polymerization wherein the coupled polymer is a conjugated diene polymer comprising the following reaction steps:
    a) polymerizing a monomer or a mixture of monomers comprising at least one conjugated diene and optionally one or more monoalkenyl arene compounds in the presence of an anionic initiator to form a living polymer arm or mixture of arms, with an average apparent molecular weight greater than 2000, measured with gel permeation chromatography (GPC) using polystyrene calibration standards, in accordance with ASTM D5296-11;
    b) reacting the living polymer arm or arms with a polyalkenyl coupling agent;
    c) terminating the polymerization if any living polymers remaining after step b); and
    d) optionally functionalizing and/or hydrogenating the coupled polymer so produced,
wherein the polyalkenyl coupling agent is an alpha,omega-bis(vinylphenyl)alkane, and
wherein the living polymer arm or mixture of arms is capped with one or more styrene monomer molecules before step b); and
    wherein a hydrocarbon lithium based initiator is used to prepare the living polymer in a concentration of from 10 to 2000 ppm Li based on the weight of the monomer or the mixture of monomers in step a).

2. The process of claim 1, wherein the polyalkenyl coupling agent is 1,2-bis(vinylphenyl)ethane.

3. The process of claim 1, wherein the amount of coupling agent added is at least 0.2 mole per mole of living polymer.

4. The process of claim 1, wherein the coupling agent is added in a single shot or more stages.

5. The process of claim 1, wherein more than the stoichiometric amount of coupling agent is used, and wherein the coupling agent molecules polymerize to form a core or nucleus of polymerized or even cross-linked coupling agent molecules.

6. The process of claim 1, wherein in step c) a deactivator is selected from the group consisting of water, alcohols, carboxylic acids, compounds with one active halogen atom, compounds with one ester group and carbon dioxide.

7. The process of claim 1, wherein, prior to step c), the living polymer is reacted with further amounts of monomers.

8. The process of claim 1, wherein at least 50%, of the original olefinic unsaturation of the polymer is hydrogenated in step d).

9. The process of claim 8 wherein less than 10% of aromatic unsaturation is hydrogenated.

10. The process of claim 1, wherein the isomer mixture in the coupling agent is varied to control the amount of star-shaped versus linear coupled polymer made in the coupling step b).

11. A conjugated diene polymer obtainable by the process of claim 1 comprising at least two arms with an average apparent molecular weight greater than 2000, measured with gel permeation chromatography (GPC) using polystyrene calibration standards, in accordance with ASTM D5296-11, attached to the residue of a coupling agent, wherein the polyalkenyl coupling agent is an alpha, omega-bis(vinylphenyl)alkane.

12. The conjugated diene polymer of claim 11, wherein the polyalkenyl coupling agent is 1,2-bis(vinylphenyl)ethane.

13. The conjugated diene polymer of claim 11, wherein the conjugated diene polymer is a homopolymer of isoprene or butadiene or a copolymer of isoprene and butadiene.

14. The conjugated diene polymer of claim 11, wherein the conjugated diene polymer is a block copolymer with at least one block of a monoalkenyl arene compound and at least one block of a conjugated diene selected from the group consisting of isoprene, butadiene, a mixture of isoprene/styrene, a mixture of butadiene/styrene, a mixture of isoprene/butadiene or a mixture of i soprene/butadiene/styrene.

15. A viscosity index improver comprising the conjugated diene polymer of claim 11 in a hydrocarbon solvent.

16. An aqueous emulsion of the conjugated diene polymer of claim 11.

17. An article made from the aqueous emulsion of the conjugated diene polymer of claim 16 and wherein said article is made by dipping.

* * * * *